United States Patent
Kono et al.

(10) Patent No.: US 10,000,415 B2
(45) Date of Patent: Jun. 19, 2018

(54) INSULATING MONOLITHIC REFRACTORY MATERIAL

(71) Applicant: NIPPON STEEL & SUMITOMO METAL CORPORATION, Tokyo (JP)

(72) Inventors: Koji Kono, Tokyo (JP); Toshimitsu Kurihara, Tokyo (JP); Yuki Matsutani, Fukuoka (JP); Tetsunori Ikebe, Fukuoka (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days. days.

(21) Appl. No.: 15/547,868

(22) PCT Filed: Feb. 8, 2016

(86) PCT No.: PCT/JP2016/053611
§ 371 (c)(1),
(2) Date: Aug. 1, 2017

(87) PCT Pub. No.: WO2016/125910
PCT Pub. Date: Aug. 11, 2016

(65) Prior Publication Data
US 2018/0016189 A1   Jan. 18, 2018

(30) Foreign Application Priority Data

Feb. 6, 2015   (JP) .................................. 2015-21774

(51) Int. Cl.
| | |
|---|---|
| *C04B 35/66* | (2006.01) |
| *F27D 1/00* | (2006.01) |
| *C04B 28/06* | (2006.01) |
| *C04B 18/02* | (2006.01) |
| *C04B 14/30* | (2006.01) |
| *C04B 14/36* | (2006.01) |
| *C04B 14/04* | (2006.01) |

(52) U.S. Cl.
CPC .............. *C04B 28/06* (2013.01); *C04B 14/04* (2013.01); *C04B 14/303* (2013.01); *C04B 14/36* (2013.01); *C04B 18/027* (2013.01); *F27D 1/00* (2013.01); *C04B 2201/30* (2013.01)

(58) Field of Classification Search
CPC ....... C04B 14/04; C04B 14/303; C04B 14/36; C04B 18/027; C04B 28/06; C04B 35/36; C04B 2111/00431; C04B 2201/30; F27D 1/00
See application file for complete search history.

(56) References Cited

U.S. PATENT DOCUMENTS

| | | | | |
|---|---|---|---|---|
| 4,843,042 A | * | 6/1989 | Dole ..................... | C04B 35/581 264/125 |
| 8,309,483 B2 | | 11/2012 | Saito et al. | |
| 8,673,797 B2 | | 3/2014 | Saito et al. | |
| 8,835,338 B2 | * | 9/2014 | Saito ........................ | C04B 7/32 106/692 |
| 2006/0065879 A1 | * | 3/2006 | Beimel ............... | C04B 20/1033 252/301.4 R |
| 2011/0251045 A1 | | 10/2011 | Saito et al. | |

FOREIGN PATENT DOCUMENTS

| | | | |
|---|---|---|---|
| CN | 102203033 A | 9/2011 | |
| EP | 2351721 A1 | 8/2011 | |
| JP | 49-10137 B1 | 3/1974 | |
| JP | 56-104783 A * | 8/1981 | ............ C03B 35/66 |
| JP | 58-26079 | 2/1983 | |
| JP | 2008290934 A | 12/2008 | |
| JP | 2010120843 A | 6/2010 | |
| WO | 2010047136 A1 | 4/2010 | |

OTHER PUBLICATIONS

Derwent-Acc-No. 1992-308650, abstract of German Patent Specification No. DD 299462 A7 (Apr. 1992).*
International Search Report dated Mar. 24, 2016 for PCT/JP2016/53611 filed Feb. 8, 2016.
Written Opinion dated Aug. 11, 2016 for PCT/JP2016/53611 filed Feb. 8, 2016.
Chatterjee, A. K., Re-examining the prospects of aluminous cements based on alkali-earth and rare-earth oxides, Cement and Concrete Research, 2009, vol. 39, p. 981-988, ISSN : 0008-8846.
International Preliminary Report dated Aug. 8, 2017 for PCT/JP2016/53611 filed Feb. 8, 2016.
Written Opinion for PCT/JP2016/53611 filed Feb. 8, 2016.

* cited by examiner

*Primary Examiner* — Anthony J Green
(74) *Attorney, Agent, or Firm* — Paul D. Bianco; Gary S. Winer; Fleit Gibbons Gutman Bongini & Bianco PL

(57) ABSTRACT

An insulating monolithic refractory material having sufficient curing strength and usable time ensured and exhibiting excellent stability at high temperature. The insulating monolithic refractory material comprises a binder and a refractory raw material; a bulk specific gravity thereof is 0.8 to 1.8 when a kneaded mixture of the insulating monolithic refractory material with water is cured at normal temperature for 24 hours and then dried at 110° C. for 24 hours; the binder comprises a calcium aluminate cement including CaO and $Al_2O_3$ as chemical components and a strontium aluminate cement including SrO and $Al_2O_3$ as chemical components; and on the basis of 100% by mass as a total mass of the binder and the refractory raw material, a content of the strontium aluminate cement is 2 to 10% by mass, and a content of CaO derived from the calcium aluminate cement is 1 to 12% by mass.

4 Claims, No Drawings

INSULATING MONOLITHIC REFRACTORY MATERIAL

TECHNICAL FIELD

The present invention relates to a monolithic refractory material, in particular, to an insulating monolithic refractory material.

BACKGROUND ART

Refractory materials are indispensable in a field including a steel manufacturing field in which a high-temperature material is treated. In this field, to make the material thermally more durable is important to stabilize the production of it and to cut the production cost of it. A monolithic refractory material, which is one of refractory materials, has been widely used in view of the merits such as better workability and easy mending.

In manufacturing of the monolithic refractory material, a press with a high pressure that is used in manufacturing of a shaped refractory material is not carried out. Therefore, characteristics of a refractory raw material and a binder are very important. In particular, a calcium aluminate cement (hereinafter, this is referred to as an alumina cement, wherein main chemical components are $CaO.Al_2O_3$, $CaO.2Al_2O_3$, and $12CaO.7Al_2O_3$) is widely used as a binder.

However, the alumina cement, if it co-exists with $Al_2O_3$, shows an expansion tendency when CA2 ($CaO.2Al_2O_3$) is formed around 1200° C. Especially, when a large quantity of the alumina cement is added, a crack is caused due to an extraordinary large expansion at high temperature.

In addition, in the insulating monolithic refractory material, the water absorbency of an insulating aggregate (lightweight aggregate) is higher than usual refractory aggregates; and thus, more amount of water needs to be added as compared with usual monolithic refractory materials. Then, the curing strength thereof may be deteriorated thereby leading to a risk of exfoliation when it is removed from a frame.

On the other hand, as to the binder for the monolithic refractory material, beside the alumina cement, a strontium aluminate cement (hereinafter, this is referred to as a strontium cement) has been known. For example, Patent Document 1 discloses the strontium cement comprising the comical composition of $SrAl_2O_4$, Patent Document 2 discloses the strontium cement comprising the chemical compositions of $SrO.Al_2O_3$, $SrO.2Al_2O_3$, and $SrO.6Al_2O_3$, and Patent Document 3 discloses the strontium cement comprising the chemical composition of $Ca_xSr_{1-x}Al_2O_4$.

Use of these strontium cements solves the expansion problem at high temperature caused by CA2 formed when the alumina cement is used. Also, the strontium cement exhibits a higher strength than the alumina cement, so that the problematic decrease in the curing strength may be solved as well.

CITATION LIST

Patent Documents

Patent Document 1: Japanese Patent Laid-Open Publication No. 2010-120843
Patent Document 2: Japanese Patent Laid-Open Publication No. S58-26079
Patent Document 3: Japanese Patent Laid-Open Publication No. 2008-290934

SUMMARY OF THE INVENTION

Problem to be Solved by the Invention

However, although the strontium cement exhibits a high strength because it contains Sr, aggregation tends to take place rapidly. Therefore, sometimes it is difficult to ensure a sufficient usable time during a construction work.

Besides, when the strontium cement is applied to the insulating monolithic refractory material, a large quantity of water needs to be added, as mentioned before, to the insulating monolithic refractory material. Therefore, in order to obtain a sufficient curing strength, a large quantity of the strontium cement needs to be added. Then, the problem of the strontium cement that the sufficient usable time cannot be ensured becomes more serious.

For example, in Patent Document 3, the strontium cement is applied not to the insulating monolithic refractory material but to the monolithic refractory material used in the kiln's lining, wherein it is described that the addition amount of water is 6.8% by mass (paragraph 0037). However, in the case of the insulating monolithic refractory material, the addition amount of water needs to be 20% or more by mass. If the addition amount of water is increased, in order to ensure the curing strength, the strontium cement needs to be added more. In Patent Document 3, it is described that the addition amount of the strontium cement is 8% by mass (paragraph 0037); however, with the addition amount of 8% by mass, a sufficient curing strength cannot be obtained in the insulating monolithic refractory material. On the other hand, if a large quantity of the strontium cement is added so as to obtain a sufficient curing strength, aggregation tends to occur rapidly so that the sufficient usable time cannot be ensured.

As mentioned above, in the insulating monolithic refractory material, when the strontium cement is simply used as a binder, this causes a problem that the curing strength cannot be obtained or a problem that the sufficient usable time in a construction work cannot be ensured.

Meanwhile, as described in Patent Document 1, the alumina cement is prone to form a low-melting point substance with an iron oxide contained in an molten iron and a slug, so that there have been problems that abrasion and infiltration take place from the portion of the alumina cement (paragraph [0011] of Patent Document 1). To solve these problems, Patent Document 1 discloses the technology in which the strontium cement is used as the binder. Because of this, if the strontium cement and the alumina cement are simultaneously used as the binder of the insulating monolithic refractory material, there is a concern that the abovementioned problems of the alumina cement may become eminent; and thus, there has been no idea that the strontium cement and the alumina cement are simultaneously used.

The problem to be solved by the present invention is to provide an insulating monolithic refractory material having sufficient curing strength and usable time ensured as well as having an excellent stability at high temperature.

Means for Solving the Problem

In order to solve the problem mentioned above, inventors of the present invention arrived at the idea that when the strontium cement and the alumina cement are simultaneously used as the binder of the insulating monolithic refractory material, both the sufficient curing strength and the stability at high temperature can be compatibly obtained, which leads to completion of the present invention.

Namely, according to an aspect of the present invention, provided is an insulating monolithic refractory material, wherein the insulating monolithic refractory material comprises a binder and a refractory raw material; a bulk specific gravity of the insulating monolithic refractory material is in a range of 0.8 to 1.8 both inclusive when a kneaded mixture of the insulating monolithic refractory material with water is cured at normal temperature for 24 hours and then dried at 110° C. for 24 hours; the binder comprises an alumina cement including CaO and $Al_2O_3$ as chemical components and a strontium cement including SrO and $Al_2O_3$ as chemical components; and on the basis of 100% by mass as a total mass of the binder and the refractory raw material, a content of the strontium cement is in a range of 2 to 10% by mass both inclusive, and a content of CaO derived from the alumina cement is in a range of 1 to 12% by mass both inclusive.

Advantageous Effects of Invention

The insulating monolithic refractory material of the present invention includes the alumina cement and the strontium cement in the binder thereof. Because of this, not only a sufficient curing strength can be obtained but also a sufficient usable time can be ensured. In addition, because the amount of CaO can be reduced with keeping the curing strength, the expansion at high temperature can be suppressed, so that the stability at high temperature can be enhanced.

DESCRIPTION OF THE EMBODIMENTS

The insulating monolithic refractory material of the present invention is characterized by that the insulating monolithic refractory material comprises a binder and a refractory raw material, and a bulk specific gravity thereof is in a range of 0.8 to 1.8 both inclusive when a kneaded mixture of the insulating monolithic refractory material with water is cured at normal temperature for 24 hours and then dried at 110° C. for 24 hours. As can be seen above, in the insulating monolithic refractory material of the present invention, the insulating property, the presupposition of the present invention, is specified through "bulk specific gravity".

In the insulating monolithic refractory material of the present invention, because a low bulk specific gravity with the range as specified above is the presupposition, a so-called lightweight aggregate is mainly used as the refractory raw material. Illustrative example of the lightweight aggregate includes a lightweight aggregate having a hollow inside the particle thereof (hollow alumina and hollow spinel) and a porous lightweight aggregate having many pores in the aggregate (porous alumina, porous spinel, and CA6 lightweight aggregate). Together with these lightweight aggregates, usual refractory materials such as a sintered alumina, a fused alumina, a calcined alumina, a fused spinel, and a siliceous raw material may also be used.

As to the binder, the alumina cement and the strontium cement are used. As to the alumina cement, the alumina cement containing any mineral selected from $CaO \cdot Al_2O_3$, $CaO \cdot 2Al_2O_3$, and $12CaO \cdot 7Al_2O_3$ may be used. There are several alumina cements, i.e., the alumina cement having the CaO content of less than 22%, the alumina cement having the CaO content of 22% or more to less than 30%, and the alumina cement having the CaO content of 30% or more to less than 40%; and these may be used singly or as a mixture of them. Meanwhile, the alumina cement having the CaO content of 30% or less may be preferably used.

As to the strontium cement, one kind or a combination of two or more kinds of the strontium cements containing minerals described in the before-mentioned Patent Documents 1 to 3 may be used; illustrative example thereof shown in it includes $SrAl_2O_4$, $SrO \cdot Al_2O_3$, $SrO \cdot 2Al_2O_3$, $SrO \cdot 6Al_2O_3$, and $Ca_xSr_{1-x}Al_2O_4$.

The blending amount of the strontium cement is in the range of 2 to 10% by mass both inclusive on the basis of 100% by mass as the total mass of the binder and the refractory raw material. If the blending amount of the strontium cement is less than 2% by mass, the curing strength cannot be ensured. If the blending amount of the strontium cement is more than 10% by mass, the usable time cannot be ensured. The blending amount of the strontium cement is preferably in the range of 3 to 7% by mass both inclusive.

In the present invention, the content of CaO derived from the alumina cement is in the range of 1 to 12% by mass both inclusive on the basis of 100% by mass as the total mass of the binder and the refractory raw material. If the content of CaO derived from the alumina cement is less than 1% by mass, the curing strength cannot be ensured. If one would like to ensure the curing strength, the strontium cement needs to be blended with the amount of more than 10% by mass, the upper limit of the blending amount thereof; but with this amount, the usable time cannot be ensured. On the other hand, if the content of CaO derived from the alumina cement is more than 12% by mass, the expansion at high temperature becomes too large. The content of CaO derived from the alumina cement is preferably in the range of 4 to 9% by mass both inclusive.

Meanwhile, besides the binders and the refractory raw materials mentioned above, other raw materials may be arbitrarily added; illustrative example of these materials includes dispersants such as sodium tripolyphosphate, sodium hexametaphosphate, polyacrylic acid, sodium polyacrylate, sodium polyacrylphosphate, polycarboxylic acid, polyether, sodium naphthalenesulfonate, and sodium ligninsulfonate; curing controllers such as boric acid, citric acid, slaked lime, sodium carbonate, lithium carbonate, and lithium phosphate; a blowing agent, a foaming agent, a thickener, an organic fiber, and a flowability controlling agent.

Amount of water to be added at the time of kneading may be determined in accordance with the method of the construction work. Specifically, the amount of water is in the range of 20 to 70% by mass both inclusive by outer percentage on the basis of 100% by mass as the total mass of the binder and the refractory raw material. If the amount of water is less than 20% by mass, not only the bulk specific gravity is prone to be 1.8 or more but also a sufficient flowability cannot be obtained, whereby leading to an unsatisfactory construction work. On the other hand, if the amount of water is more than 70% by mass, a sufficient curing strength may not be ensured.

In the insulating monolithic refractory material of the present invention, in order to ensure the sufficient FeO resistance, the amount of the $SiO_2$ component is preferably 1% or less by mass on the basis of 100% by mass as the total mass of the binder and the refractory raw material.

EXAMPLES

Each of the insulating monolithic refractory materials of Examples shown in Table 1 was evaluated with regard to the usable time, the bulk specific gravity, the curing flexural strength, the maximum value of the expansion rate up to 1500° C., and the FeO resistance; and on the basis of these evaluations, the comprehensive evaluation was made.

TABLE 1

| | | Example 1 | Example 2 | Example 3 | Example 4 | Example 5 | Example 6 | Example 7 | Example 8 | Example 9 | Example 10 | Example 11 | Example 12 | Example 13 | Example 14 | C. Example 1 | C. Example 2 | C. Example 3 | C. Example 4 | C. Example 5 | C. Example 6 |
|---|---|---|---|---|---|---|---|---|---|---|---|---|---|---|---|---|---|---|---|---|---|
| Refractory raw material | CA6 lightweight aggregate | 50 | 50 | 50 | 50 | 46 | 50 | 50 | 50 | | 65 | 50 | 50 | 50 | 50 | 50 | 50 | 50 | 40 | 50 | 50 |
| | Hollow spinel | | | | | | | | | 50 | | | | | | | | | | | |
| | Fumed silica | | | | | | | 0.8 | 1.8 | | | | | | | | | | | | |
| | Sintered alumina | 15 | 15 | 15 | 34 | 0 | 15 | 14.2 | 13.2 | 15 | | 15 | 15 | 25 | 12 | 8 | 15 | 38 | | 15 | 15 |
| Binder | Alumina cement (Cement A) | 30 | 33 | 25 | 6 | | 20 | 30 | 30 | 30 | 30 | 32 | 28 | 20 | | 30 | 34 | 2 | | 35 | |
| | Alumina cement (Cement B) | | | | | 44 | 10 | | | | | | | | 33 | | | | 50 | | 35 |
| | Strontium cement | 5 | 2 | 10 | 10 | 10 | 5 | 5 | 5 | 5 | 5 | 3 | 7 | 5 | 5 | 12 | 1 | 10 | 10 | | |
| Chemical component | CaO derived from alumina cement | 5 | 6 | 5 | 1 | 12 | 6 | 5 | 5 | 5 | 5 | 6 | 5 | 4 | 9 | 5 | 6 | 0.4 | 14 | 6 | 0 |
| | SiO2 | 0.2 | 0.2 | 0.2 | 0.2 | 0.2 | 0.2 | 1.0 | 2.0 | 0.2 | 0.2 | 0.2 | 0.2 | 0.2 | 0.2 | 0.2 | 0.2 | 0.2 | 0.2 | 0.2 | 0.2 |
| Evaluation | Water added (% by mass) | 45 | 45 | 45 | 45 | 45 | 45 | 45 | 45 | 20 | 70 | 45 | 45 | 45 | 45 | 45 | 45 | 45 | 45 | 45 | 45 |
| | Usable time (min) | 180 | 360 | 100 | 110 | 90 | 180 | 180 | 180 | 130 | 200 | 300 | 130 | 180 | 200 | 80 | 400 | 110 | 90 | 480 | 20 |
| | Bulk specific gravity | 1.2 | 1.2 | 1.2 | 1.6 | 1.2 | 1.2 | 1.1 | 1.1 | 1.5 | 0.8 | 1.2 | 1.2 | 1.3 | 1.2 | 1.2 | 1.2 | 1.6 | 1.2 | 1.2 | 1.2 |
| | Curing flexural strength (MPa) | 1.3 | 1.0 | 1.6 | 1.0 | 1.2 | 1.3 | 1.2 | 1.1 | 1.5 | 1.0 | 1.1 | 1.5 | 1.2 | 1.4 | 1.7 | 0.8 | 0.8 | 1.3 | 0.8 | 1.8 |
| | Maximum expansion rate up to 1500° C. (%) | 1.0 | 1.2 | 0.9 | 0.9 | 1.3 | 1.1 | 1.0 | 1.0 | 0.9 | 1.1 | 1.1 | 1.0 | 0.9 | 1.2 | 0.9 | 1.2 | 0.9 | 1.4 | 1.3 | 0.8 |
| | FeO resistance | ○ | ○ | ○ | ○ | ○ | ○ | ○ | Δ | ○ | ○ | ○ | ○ | ○ | ○ | ○ | ○ | ○ | ○ | ○ | ○ |
| | Comprehensive evaluation | ○ | ○ | ○ | ○ | ○ | ○ | ○ | Δ | ○ | ○ | ○ | ○ | ○ | ○ | X | X | X | X | X | X |

In addition to the binders and the refractory raw materials as shown in Table 1 with the total mass of 100%, the insulating monolithic refractory material of each Example used a polycarboxylic acid as the dispersant. To this insulating monolithic refractory material was added water the amount of which is shown in each Example by the outer percentage relative to 100% by mass as the total mass of the binders and the refractory raw materials. After the resulting mixture was kneaded, it was subjected to the above-mentioned evaluations. In each Example, a CA6 lightweight aggregate or a hollow spinel was used as the lightweight aggregate, and a fumed silica was used as the siliceous raw material, and a sintered alumina was used as the aluminous raw material. As to the alumina cement, Cement A which is the alumina cement containing 18% of CaO, or Cement B which is the alumina cement containing 27% of CaO, was used.

The usable time is the time starting from when the kneaded mixture is allowed to stand in a plastic bag at 20° C. until the time when the free flow value thereof becomes less than 150 mm. In view of a longer time for a construction work as compared with a usual pouring-type monolithic refractory material, the acceptance criterion was set at the time when the usable time was 90 minutes or more.

The bulk specific gravity was measured in accordance with JIS R 2205 with regard to the sample that was obtained by curing the kneaded mixture in an atmospheric temperature (normal temperature) of 20° C. for 24 hours followed by drying at 110° C. for 24 hours. The bulk specific gravity is an indicator of the insulating property; so, in the present invention, the presupposition thereof is set in the range of 0.8 to 1.8 both inclusive.

If the bulk specific gravity is less than 0.8, the amount of the lightweight aggregate increases, which leads to an increase in the addition amount of water even if the strontium cement with the amount of 10% is added; therefore, in this case, the curing strength of 1.0 MPa cannot be ensured. On the other hand, if the bulk specific gravity is more than 1.8, the insulating function is insufficient.

The curing flexural strength is the flexural strength measured with regard to the sample that was obtained by curing the kneaded mixture at the atmospheric temperature of 20° C. for 24 hours. If the curing flexural strength is less than 1.0 MPa, exfoliation occurs when a frame is removed; and thus, the acceptance criterion was set at the curing flexural strength of 1.0 MPa or more.

The maximum value of the expansion rate up to 1500° C. was measured as follows. The kneaded mixture was cured at the atmospheric temperature of 20° C. for 24 hours and then dried at 350° C. for 24 hours. Then, the expansion rate of the sample thus obtained was measured with heating it to 1500° C.; and the maximum value of the expansion rate measured during this process was evaluated. If the maximum value of the expansion rate up to 1500° C. is more than 1.3%, the structure deterioration due to expansion takes place; and thus, the acceptance criterion was set at 1.3% or less as the maximum value of the expansion rate.

The FeO resistance was measured as follows. The kneaded mixture was cast into the hole (diameter of 35 mm and depth of 35 mm) formed in the center of the crucible form (85 mm×85 mm×80 mm). After the sample that was cast in the crucible form was cured at the atmospheric temperature of 20° C. for 24 hours, the frame was removed, and then, the sample was dried at 110° C. for 24 hours. Then, after 40 g of iron oxide was put into the crucible form, they were burned at 1500° C. for 5 hours; and then, the size of the sample corroded by the iron oxide was measured. With this measurement, when the corrosion depth was less than 1 mm, it was judged to be excellent (◯), when the corrosion depth was in the range of 1 mm or more to less than 1.5 mm, it was judged to be good (Δ), and when the corrosion depth was 1.5 mm or more, it was judged to be unacceptable (×).

The comprehensive evaluation was made as follows. When all the acceptance criteria in the evaluations mentioned above were satisfied, and if the FeO resistance was excellent, it was marked with ◯, but if the FeO resistance was good, it was marked with Δ. If any one of the criteria was not satisfied, it was marked with ×.

Meanwhile, each of the chemical components shown in Table 1 is expressed as the content on the basis of 100% by mass as the total mass of the binders and the refractory raw materials.

All the insulating monolithic refractory materials of Examples 1 to 7 and 9 to 14 are within the range of the present invention; so, their comprehensive evaluations are all ◯. Example 8 is the example in which the content of the $SiO_2$ component is 2.0% by mass. In this example, the FeO resistance is somewhat lower than those of other Examples in which the content of the $SiO_2$ component is 1.0% or less by mass; and thus, the comprehensive evaluation thereof is Δ. From this, to ensure the sufficient FeO resistance, it can be said that the content of the $SiO_2$ component is preferably 1.0% or less by mass.

Comparative Example 1 is the example in which the blending amount of the strontium cement is more than the upper limit of the present invention, so that the sufficient usable time could not be obtained. On the other hand, Comparative Example 2 is the example in which the blending amount of the strontium cement is less than the lower limit of the present invention, so that the curing strength of more than 1.0 MPa could not be obtained.

Comparative Example 3 is the example in which the content of CaO derived from the alumina cement is less than the lower limit of the present invention. In this example, the sufficient curing flexural strength could not be obtained. On the other hand, Comparative Example 4 is the example in which the content of CaO derived from the alumina cement is more than the upper limit of the present invention. In this example, the maximum value of the expansion rate up to 1500° C. was more than 1.3%.

Comparative Example 5 is the example in which only the alumina cement was used as the binder. In this example, the sufficient curing flexural strength could not be obtained. On the other hand, Comparative Example 6 is the example in which only the strontium cement was used as the binder. In this example, the usable time was remarkably short.

The invention claimed is:

1. An insulating monolithic refractory material, wherein the insulating monolithic refractory material comprises a binder and a refractory raw material;
a bulk specific gravity of the insulating monolithic refractory material is in a range of 0.8 to 1.8 both inclusive when a kneaded mixture of the insulating monolithic refractory material with water is cured at normal temperature for 24 hours and then dried at 110° C. for 24 hours;
the binder comprises a calcium aluminate cement including CaO and $Al_2O_3$ as chemical components and a strontium aluminate cement including SrO and $Al_2O_3$ as chemical components; and
on the basis of 100% by mass as a total mass of the binder and the refractory raw material, a content of the strontium aluminate cement is in a range of 2 to 10% by mass both inclusive, and a content of CaO derived from the calcium aluminate cement is in a range of 1 to 12% by mass both inclusive.

2. The insulating monolithic refractory material according to claim 1, wherein on the basis of 100% by mass as the total mass of the binder and the refractory raw material, a content of an $SiO_2$ component is 1% or less by mass.

3. The insulating monolithic refractory material according to claim 1, wherein on the basis of 100% by mass as the total mass of the binder and the refractory raw material, water is added to the insulating monolithic refractory material, the amount of which is in the range of 20 to 70% by mass both inclusive by outer percentage.

4. The insulating monolithic refractory material according to claim 2, wherein on the basis of 100% by mass as the total mass of the binder and the refractory raw material, water is added to the insulating monolithic refractory material, the amount of which is in the range of 20 to 70% by mass both inclusive by outer percentage.

* * * * *